Oct. 26, 1965   D. W. MOYER ETAL   3,213,884
SELF-SEALING COUPLING AND DIRECTIONAL VALVE
Filed Jan. 23, 1963                                        2 Sheets-Sheet 1
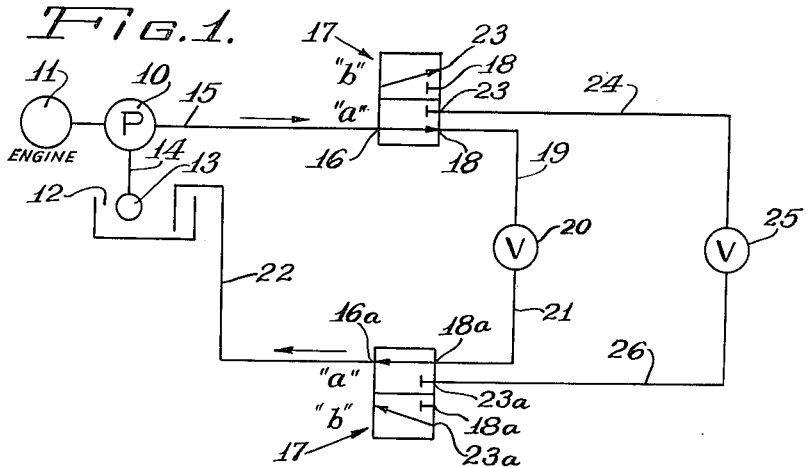
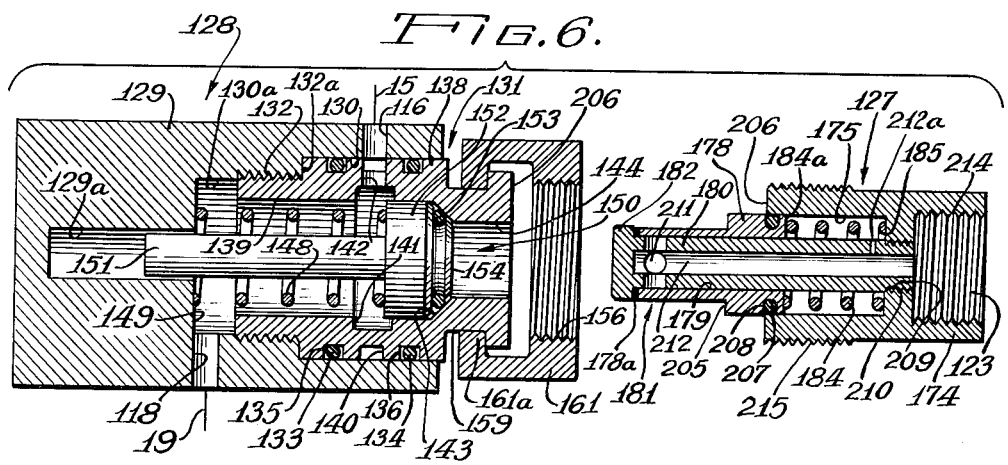
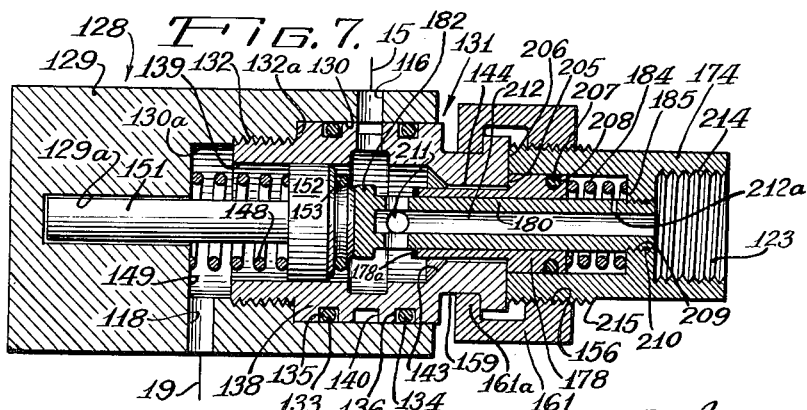
Inventors:
Donald W. Moyer
Eugene P. Virtue
By
Staelen Heavy Attys.

Oct. 26, 1965  D. W. MOYER ETAL  3,213,884
SELF-SEALING COUPLING AND DIRECTIONAL VALVE
Filed Jan. 23, 1963  2 Sheets-Sheet 2

Inventors:
Donald W. Moyer
Eugene P. Virtue
By
Walter L. Heavy Attys.

United States Patent Office 3,213,884
Patented Oct. 26, 1965

3,213,884
SELF-SEALING COUPLING AND
DIRECTIONAL VALVE
Donald W. Moyer, Chicago, and Eugene P. Virtue, Tinley Park, Ill., assignors to International Harvester Company, Chicago, Ill., a corporation of New Jersey
Filed Jan. 23, 1963, Ser. No. 253,379
1 Claim. (Cl. 137—614.03)

This invention relates to coupling devices for fluid pressure conduits, and more particularly to the self-sealing type coupling utilized in association with flexible conduits for connecting a hydraulically actuated device into a hydraulic circuit and to a source of fluid pressure.

Heretofore, separable self-sealing couplings of the readily connectible and disconnectible type have been utilized for rapidly connecting a hydraulically actuated device into and for disconnecting such device from a fluid pressure system. Coupling devices of this character are commonly used with farm and industrial tractor vehicles wherein auxiliary hydraulically operated motor devices or other accessory equipment, either mounted on or remote therefrom, are coupled to and adapted for operation by the fluid pressure system of the vehicle. In the known prior art devices of this character such couplings were employed only to connect into a fluid pressure circuit in order to utilize the power therein for actuating an attached device, and then upon completion of its task to disconnect said device therefrom with a minimum loss of fluid and disruption to said circuit, and were not additionally concerned with interrupting the flow of fluid pressure to another hydraulically operated device in order to divert the fluid pressure therefrom to a different device. The present invention, however, is particularly concerned with a coupling of the type that will accomplish the latter type of operation.

It is a primary object of this invention, therefore, to provide a separable type of self-sealing, valved coupling assembly wherein when the parts thereof are uncoupled or disengaged one part of the coupling will normally provide a passage therethrough for fluid flow from a pressure source to a first hydraulically actuated device, and when the parts are coupled together or engaged fluid flow is directed from said source to a second hydraulic device while concurrent therewith fluid flow to the first device is interrupted by closing off the connection thereto.

Another object is to provide an improved self-sealing, separable, valved coupling assembly that permits rapid coupling of a source of fluid pressure to a hydraulically actuated device.

A further object is to provide a combination self-sealing coupling and directional valve device fashioned with separable parts and which is selectively operable to permit directing fluid pressure from a source to one or another of two hydraulically operated devices with a minimum of disturbance to an associated fluid pressure circuit.

A still further object is to provide a separable self-sealing coupling having a slidable component in one part of the coupling which, when the coupling is in a normal non-coupled position, permits flow of fluid from a pressure source through said coupling to a first hydraulic device, and which slidable component is engageable by a member in the other part of said coupling for slidably actuating said slidable component and causing interruption of flow from said source to said first device and concurrent therewith directing said flow past said slidable component to a second device when the separable parts are coupled together.

An important object of the invention is to provide in a separable type, self-sealing, valved coupling directional valve means selectively operable upon engagement and disengagement of the separable parts of said coupling for respectively directing fluid flow from a pressure source to a first or to a second hydraulic device.

Another important object is to provide a combination coupling and directional valve of the aforementioned type which is quickly and easily engaged and disengaged, and which, additionally, may be coupled and uncoupled utilizing a minimum of physical exertion.

The foregoing and other objects and advantages are attained by the present invention, various novel features of which will be apparent from the description herein and the accompanying drawings disclosing embodiments of the invention, and will be more particularly pointed out in the appended claims.

FIGURE 1 is a diagrammatic representation of a hydraulic system showing an adaptation of the coupling and valve device of the present invention;

FIGURE 6 is a longitudinal, generally sectional view, illustrating a modified form of the proposed device, and showing the separable parts in uncoupled or disengaged relationship; and FIGURE 7 is a view similar to FIGURE 6 but showing the separable parts of the device in coupled or engaged relationship.

Figure 2:
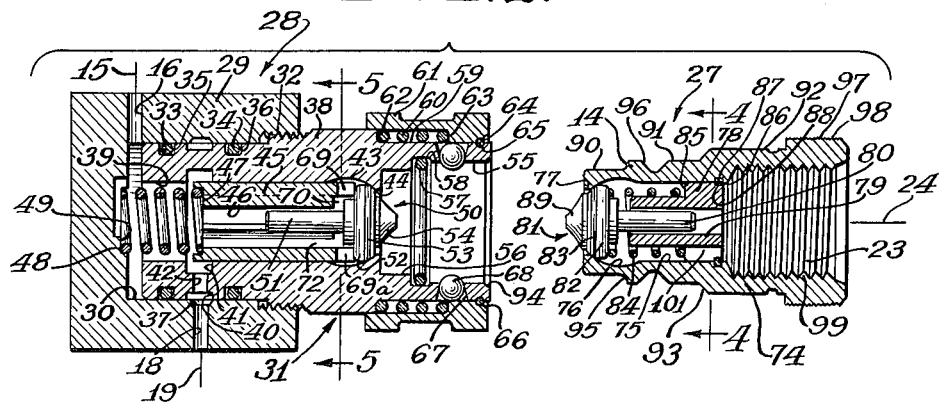
FIGURE 2 is a longitudinal, generally sectional view, illustrating one form of the proposed device, and showing the separable parts in uncoupled or disengaged relationship.

Referring now to the drawings it will be seen that the present invention has been shown as being incorporated in a hydraulic system which, for purposes of simplification, has been diagrammatically illustrated in FIGURE 1. A source of fluid pressure is shown generally by the numeral 10 and this may be driven by suitable power means such as the vehicle engine 11 of the tractor vehicle (not shown) to which the invention may be applied, while a source of hydraulic fluid from reservoir 12 may be directed through a filter 13 and a conduit line 14 into said pressure source. An outlet of the pressure source 10 is connected by a conduit 15 to a port opening 16 of the combination coupling and directional valve device, indicated generally by the numeral 17, while another port opening 18 of said coupling is connected by a conduit 19 to an auxiliary equipment hydraulic motor device such as indicated diagrammatically at 20. The opposite side of said motor is connected by circuit 21 to a port opening 18a of another similar coupling 17a and a port opening 16a of said latter coupling is connected by conduit 22 to the reservoir 12. While the motor 20 may be any suitable unit provided for operation of the auxiliary equipment desired it is here indicated as a variable motor associated with a power take off mechanism (not shown) such as is frequently used with tractor vehicles and will, of course, be provided with suitable controls (not shown) but, since such controls are conventional and well understood, no further elaboration thereof will be presented herein.

Another port opening 23 of coupling 17 may be connected by a flexible conduit 24 to one side of another hydraulic device, such as indicated at 25, while the opposite side of said latter device may be connected by another flexible conduit 26 to a corresponding port opening 23a of the coupling 17a. From the diagrammatic representation of FIGURE 1 it will be seen that the coupling units 17 and 17a may be said to function as two-position directional valves so that when these couplings are arranged in the position indicated "a" in the diagram hydraulic device 20 is operative and device 25 is inoperative, while in position "b" hydraulic device 25 is operative and device 20 is inoperative. It will also be noted that the coupling in the pressure line 15 is connected so that the flow therethrough is in one direction while the coupling in the return flow line 22 passes the flow therethrough in the opposite direction. In both cases the functions of the coupling units are identical, as is also the manner of operation thereof. It will be appreciated, also, that the coupling 17a may be eliminated, if desired, without deviating from any of the teachings of the invention. In which latter case the conduit 26 could discharge into the reservoir 12 while conduits 21 and 22 could be connected together. It will, also, be understood that when two coupling units have been used, as indicated, the operation of the two units would generally be coordinated.

In the event the hydraulic device employed with the coupling is a single acting ram cylinder the return conduit connection to the reservoir may be eliminated, as is well understood.

In FIGURE 2 there is shown a longitudinal and generally sectional view of one preferred form of the proposed combined coupling and directional valve assembly illustrated only diagrammatically in FIGURE 1. It will be seen from FIGURE 2 that the proposed coupling and valve assembly is fashioned as separate units, such as the male unit indicated generally at 27 and the female unit shown at 28, which may be engaged or coupled together to accomplish the valving action desired. The female unit 28 is fashioned with a casing or support structure 29 having a central recess or bore 30 extending therein adapted to receive a sleeve-like body portion, indicated generally by the numeral 31, which is fixedly positioned therewithin by suitable thread means 32.

Soft rubber rings 33 and 34 positioned in annular grooves 35 and 36 in said body portion provide sealing means to prevent seepage of fluid along the bore 30. The port opening 16 which connects with conduit 15 opens into the closed inner end of bore 30, and port opening 18 which is adapted for connection with the conduit 19 opens into an annular recess 37 that opens into said bore.

The female body portion 31 is fashioned as an elongated sleeve-like member 38 having a central bore 39 therewithin and having one end of said sleeve member dimensioned for close fit positioning in the bore 30, while the opposite end extends outwardly beyond the casing structure 29. A pair of radially spaced annular grooves 40 and 41 in the sleeve 38 are interconnected by radial passageway 42 and disposed for aligned registration with the annular groove 37 in bore 30. The outward end of the sleeve bore 39 is provided with a concave valve seat portion 43 which opens into a reduced diameter portion 44 of said bore. An elongated tubular valve member 45 having an axial bore 46 therethrough is dimensioned for slidable positioning within the sleeve bore 39, and a recess 47 in the inner end face of said tubular valve member seats one end of a coiled spring 48 the opposite end of which abuts the inner end face 49 of bore 30. A poppet valve, indicated generally at 50, has a stem 51 extending therefrom and said stem is slidably received in the axial bore 46, and a head 52 at one end of said stem includes a rubber ring seal 53 which engages the concave valve seat 43 when said poppet is closed and with spring 48 normally holding poppet 50 seated against said valve seat. A frusto-conical shaped portion extends outwardly from said head and provides an abutment 54 for purposes which will subsequently be explained.

The outward end of sleeve member 38 is fashioned with an enlarged bore 55 extending inwardly therefrom to a counterbore 56 of somewhat less diameter that, in turn, extends inwardly to the reduced diameter portion 44 of bore 39. A soft rubber ring 57 mounted in an annular recess 58 in bore 55 provides a seal as will subsequently be explained. An outwardly opening annular or peripheral recess 59 extending inwardly from the outer end of sleeve member 38 accommodates a coiled spring 60, and a collar member 61 positioned thereover serves to confine said spring between a shoulder 62 at the end of recess 59 and a shoulder 63 in said collar. A snap ring 64 mounted in an annular groove 65 in sleeve member 38 abuts a chamfered edge 66 of collar 61 and serves to delimit axial displacement outwardly of said collar. A plurality of radially inwardly tapered holes 67 in the sleeve 38 accommodate balls 68 which project partially therethrough into the bore 55 but are prevented from coming out of the holes by the collar member 61.

Figure 5:
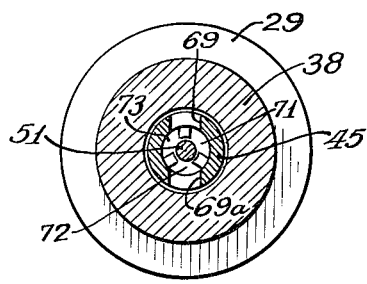
FIGURE 5 is a vertical sectional view taken along the line 5—5 of FIGURE 2.

The tubular member 45 is fashioned at the poppet engaging end thereof with a pair of radially opposite slots 69, 69a which open into a counterbore chamber 70, and extending longitudinally inwardly from said chamber along the bore 46 are three equally spaced slot-like recesses 71, 72 and 73 (see FIGURE 5). The foregoing slots provide passageways for fluid flow from port opening 16 to the poppet valve head 52 and the pressure of such fluid normally aids spring 48 in holding said poppet head against valve seat 43. These slots also provide fluid passageways through the coupling when the two parts of the coupling are engaged or coupled together, as will subsequently be explained, and may be considered as fluid carrying means or a portion of the fluid passage means therethrough. The tubular member 45 and the cooperating elements associated therewith are proportioned so that normally, in the uncoupled or disengaged position indicated at "a" in FIGURE 1, the inner end of said tubular member is disposed so that fluid may flow from port opening 16 through the chamber area of bore 39 and out through groove 41, passage 42, groove 40, recess 37 and port opening 18 to conduit 19 connected to hydraulic device 20. The chamber area of bore 30 behind body sleeve 38, the chamber area of bore 39, groove 41, passage 42 and groove 40 may be spoken of as a fluid passage means which, additionally, may include the fluid passageways through the valve.

The male portion 27 of the combination coupling and valve unit is fashioned as an elongated sleeve-like member 14 having a bore 75 therewithin, and at one end of the latter bore there is provided a concave valve seat portion 76 which opens into a reduced diameter portion 77 of said bore. A tubular member 78 dimensioned to closely fit within the bore 75 has an axial bore 79 therethrough which slidably receives the stem 80 of a poppet valve 81. A head 82 on said valve includes a rubber ring seal 83 which engages the concave valve seat 76, and a spring 84 abutting head 82 and a shoulder 85 on tubular member 78 serves to normally hold the poppet 81 seated against valve seat 76. A snap-ring 86 positioned in part in an annular groove 87 in the bore 75 and in part in a recess 88 in tubular member 78 prevents axial displacement of said tubular member in a direction away from the poppet head 82. A frusto-conical shaped portion extends outwardly from said head and provides an abutment 89 that is adapted to engage abutment 54 of poppet valve 50 when the two parts or units of the coupling are engagingly coupled.

The outer surface of sleeve member 74 is fashioned to provide a plurality of differently diametered contiguous areas to cooperate with similar areas of sleeve member 38. A first diameter 90 adjacent the insertable end of said sleeve is dimensioned for slidable reception in bore 56 of sleeve member 38, and a second diameter 91 is dimensioned for slidable reception in enlarged bore 55. A third diameter 92 serves to provide a tapered shoulder 93 at the inner edge thereof. The shoulder 95 formed between the first and second diameters, preferably, is concave so as to more closely engage seal member 57. The second diameter portion 91 has an inwardly tapered annular groove 96 therein that cooperates with balls 68 to provide detent means when the two portions of the coupling unit are engaged. A fourth diameter area 97 may be provided with suitable knurling 98 to aid in manually inserting and removing the male portion or unit 27 of said coupling. The port opening 23 of member 74 may be provided with thread means 99 to receive a suitable coupling connection (not shown) mounted on the end of flexible conduit 24.

Figure 4:
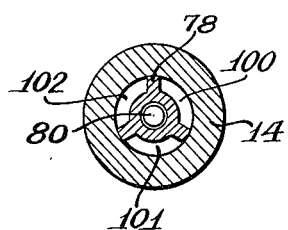
FIGURE 4 is a vertical sectional view taken along the line 4—4 of FIGURE 2.

The tubular member 78 is fashioned with a plurality of three axially extending slots 100, 101, and 102 (see FIGURE 4) which provide fluid passageways or fluid carrying means through the associated portion of the coupling unit when the portions or units thereof are engagingly coupled.

Figure 3:
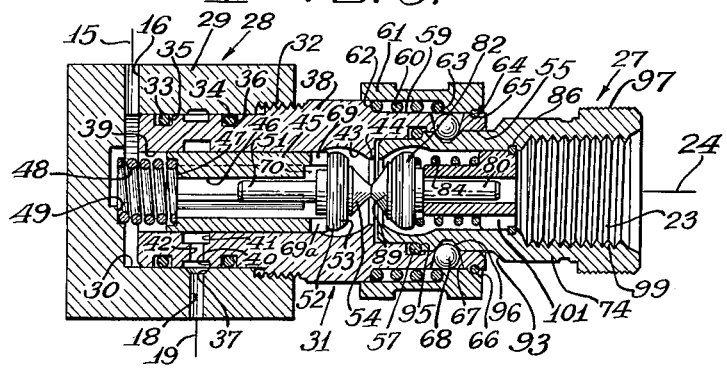
FIGURE 3 is a view similar to FIGURE 2 but showing the separable parts of the proposed device in coupled or engaged relationship.

In operation the portion 27, upon insertion in the portion 28, brings the abutments 54 and 89 into engagement and thus forces the heads 52 and 82 off their respective valve seats thereby permitting fluid to be directed from port opening 16, through the coupling to port opening 23 and thence to the remote hydraulic device 25. As poppet 50 moves off its seat tubular member 45 is axially displaced, leftwardly as viewed in FIGURES 2 and 3, thus closing port opening 18 connected with conduit 19 and thereby diverting fluid from hydraulic device 20. As the two portions or units of the coupling are engaged collar 61 is manually displaced leftwardly against the reaction of spring 60 so as to permit balls 68 to ride radially outwardly sufficiently to clear the diameter 91 after which they drop into the tapered annular groove 96, and, as collar 61 returns to its normal position, the balls together with said groove provide detent means which retain the two portions of the coupling unit tightly coupled and with concave shoulder 95 closely engaging sealing ring 57.

In FIGURES 6-7 there is illustrated a modified form of the proposed invention which perform the same functions as the form shown in FIGURES 2-5 although the structure of the modification is somewhat simplified as compared with that of the initially described form. Corresponding elements of the modification have been referenced with the same numerals plus 100 as utilized for the first form. As before, the female unit portion 128 of the coupling is fashioned with a casing or support structure 129 having a bore 130 and a counterbore 130a therein that receive in a close fit relationship a sleeve-like body member indicated generally at 131 and thread means, such as indicated at 132, on the sleeve and casing may cooperate with shoulder 132a for fixedly securing said sleeve member within the casing. Rubber sealing rings 133 and 134 disposed in annular grooves 135 and 136 in said sleeve member provide suitable fluid sealing means along the bore 130. Port opening 116 which may connect with conduit 15 opens into bore 130, while port opening 118 which is adapted for connection with conduit 19 opens into the inner closed end of counterbore 130a.

The female body portion 131 is fashioned as an elongated sleeve-like member 138 having a central bore 139 therewithin and a portion of one end of said sleeve member is dimensioned for close fit positioning in the bore 130, while the opposite end of the sleeve member extends outwardly beyond the casing structure 129. A pair of radially spaced annular grooves 140 and 141 in sleeve 138 are interconnected by a radial passageway 142 and disposed for aligned registration with port opening 116. The outward end of bore 139 is provided with a tapered or chamfered edge portion 143 that functions as a valve seat and which opens into a reduced diameter portion 144 of said bore. A coil spring 148 seated at one end thereof against an inner end face 149 of counterbore 130a has the opposite end thereof abutting a poppet valve, indicated generally at 150, which is slidably positioned within the bore 139. Said poppet is fashioned with a stem 151 extending therefrom and said stem is slidably and supportably received in a loose fit fashion in a recess or pocket 129a in the end wall portion of casing structure 129. A valve head 152 at the inner end of stem 151 includes a rubber ring seal 153 which engages the tapered or chamfered valve seat 143 when the associated poppet is closed. The spring 148 normally holds poppet 150 seated against said valve seat with the valve head thereof so disposed axially that it does not close off the annular groove 141 and thereby prevent flow of fluid through port opening 116 to port opening 118.

The outward end of sleeve member 138 is fashioned with an outwardly opening annular groove or recess 159 and a nipple-like collar member 161 positioned over said sleeve end has an annular flange 161a thereon that is loosely received in said annular groove. A threaded bore 156 in the outer end of collar member 161 is adapted to receive the male unit portion 127 which may then be drawn up tightly into the female unit portion in fluid-sealing relationship as will subsequently become apparent.

The male portion 127 of the modified form is fashioned as a sleeve-like member 174 having a bore 175 therewithin, and a tubular member 178 dimensioned to slidably fit within bore 175 has an axial bore 179 therethrough which receives the stem 180 of a poppet, indicated generally at 181, having a head 182 on one end of said stem. A coiled spring 184 disposed to abuttingly engage an end face 184a of tubular member 178 and a shoulder 185 on the sleeve member 174 serves to normally urge said tubular member outwardly so that a shoulder 205 on the outer surface thereof closely engages an end face 206, of sleeve member 138, from the other portion of said coupling, when the two parts thereof are engaged or coupled together. A rubber gasket 178a at the end face of tubular member 178 engages head 182 and provides sealing means when the two coupling elements are disconnected. A rubber ring 207 disposed in an annular groove 208 in tubular member 178 provides fluid sealing means along the bore 175. The end of stem 180 opposite that supporting valve head 182 is positioned within a reduced diameter portion 209 of bore 175 and cooperating thread means 210 on said stem and bore serve to securely position said stem therewithin. A plurality of radial openings 211 proximate the head end of said stem open into an axially extending fluid passege 212 which, in turn, opens into a port opening 123 at the outer end of sleeve member 174. A bleed passage or vent, such as indicated at 212a, interconnecting the passage 212 and the chamber area containing the spring 184 may be provided for releasing fluids accumulating behind the tubular member 178. The port opening 123 is threaded as shown at 214 to receive a suitable coupling connection (not shown) mounted on the end of flexible conduit 24. The outer surface of sleeve member 174 is fashioned with threads 215 which, when the separable portions of said coupling are coupled together, cooperate with threads 156 in collar 161 to draw the two portions of the coupling assembly into a fluid tight relationship. When this is done valve head 182 engages abutment 154 on poppet 150 and displaces said poppet so that fluid communication is established from conduit 15 through port opening 116, grooves 140, radial passage 142, groove 141 into the chamber delimited by bore 139 thence through radial openings 211 into axial passageway 212 and out through port opening 123 to conduit 24 and the auxiliary hydraulic device 25. Concurrent therewith poppet valve 150 closes off the fluid flow to port opening 118 and hydraulic device 20.

It should now be apparent that a novel, self-sealing, coupling and directional valve device has been shown and described, and it is to be understood that changes may be made in the construction without departing from the spirit of the invention or the scope thereof as defined in the appended claim.

What is claimed is:

A self-sealing, releasable coupling for fluid pressure lines comprising first and second coupling members, means for locking said members together in connected relation, said first member having an inlet and first and second outlets, said inlet being adapted for connection to a source of fluid pressure and said first outlet being adapted for connection to a first hydraulic device, said second member having an inlet and an outlet with said latter outlet being adapted for connection to a second hydraulic device, said first member having a bore therein and a valve including a head having oppositely disposed faces with a stem extending from one face thereof slidably mounted within said bore, spring means normally urging said valve head into position closing said second outlet, said valve being subjected to line pressure thereby augmenting the closing action of said valve when said members are in a disconnected relation, said second member having a bore therein and a valve slidably mounted within said bore and spring means normally urging the latter valve into a position closing the inlet of said second member when said members are disconnected, said first member being arranged when said members are disconnected to provide fluid flow communication from the inlet thereof through the associated bore to the first outlet thereof, said valves being operable upon interconnection of said members for interrupting fluid flow communication between the inlet and first outlet of said first member and concurrently therewith being operable for effecting fluid flow from the inlet of said first member through the bore thereof and about the face of the valve head opposite the face thereof from which said stem extends of said first member to said second outlet thereof and thence through the inlet and past the valve of said second member to the outlet of the latter member.

References Cited by the Examiner

UNITED STATES PATENTS

| | | | |
|---|---|---|---|
| 2,854,258 | 9/58 | Hickey | 137—614.04 |
| 3,049,148 | 8/62 | Richardson | 137—614.04 XR |
| 3,117,592 | 1/64 | Abbey | 137—614.03 |

FOREIGN PATENTS

| | | |
|---|---|---|
| 1,239,825 | 7/60 | Germany. |
| 581,087 | 10/46 | Great Britain. |

ISADOR WEIL, *Primary Examiner.*

WILLIAM F. O'DEA, *Examiner.*